US012600048B2

(12) United States Patent
Scimone et al.

(10) Patent No.: US 12,600,048 B2
(45) Date of Patent: *Apr. 14, 2026

(54) AUTOMATICALLY RETRACTING SCRAPER WITH BLADE STOP

(71) Applicant: Slice, Inc., Sunny Isles, FL (US)

(72) Inventors: Thomas John Scimone, Sunny Isles, FL (US); Robert Joseph Gallegos, Freemont, CA (US)

(73) Assignee: Slice Safety Cutter, Inc., Irvine, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 18/503,165

(22) Filed: Nov. 6, 2023

(65) Prior Publication Data

US 2024/0066726 A1 Feb. 29, 2024

Related U.S. Application Data

(63) Continuation of application No. 17/392,167, filed on Aug. 2, 2021, now Pat. No. 11,806,887, which is a continuation of application No. 16/382,496, filed on Apr. 12, 2019, now Pat. No. 11,077,567.

(51) Int. Cl.
*B26B 5/00* (2006.01)
*B08B 1/16* (2024.01)

(52) U.S. Cl.
CPC .............. *B26B 5/003* (2013.01); *B08B 1/165* (2024.01)

(58) Field of Classification Search
CPC ................................ B26B 5/003; B08B 1/165
See application file for complete search history.

(56) References Cited

U.S. PATENT DOCUMENTS 4,316,324 A * 2/1982 Cochran .................. B26B 3/06 30/162
6,192,589 B1 * 2/2001 Martone ................ B26B 5/001 30/162
9,901,367 B2 * 2/2018 Arrigo ............... A61B 17/3211

* cited by examiner

*Primary Examiner* — Liang Dong

(74) *Attorney, Agent, or Firm* — Sigma Law Group LLC; James Smedley; Alex Korona

(57) ABSTRACT

An auto-retract scraper is described herein. The auto-retract scrape comprises a housing, a slider, a blade, a rotating hard stop, and a torsion spring. The rotating hard stop is rotated clockwise forcing the blade forward and out of the housing when the slider is engaged.

19 Claims, 3 Drawing Sheets

AUTOMATICALLY RETRACTING SCRAPER WITH BLADE STOP

CROSS-REFERENCE TO RELATED APPLICATIONS

This application is a continuation of U.S. Non-Provisional Utility patent application Ser. No. 17/392,167, filed Aug. 2, 2021, and entitled "Automatically Retracting Scraper with Blade Stop", which is a continuation of U.S. Non-Provisional Utility patent application Ser. No. 16/382,496, filed Apr. 12, 2019, and entitled "Automatically Retracting Scraper with Blade Stop", the entire disclosures of each of which are hereby incorporated herein by reference.

FIELD OF INVENTION

This application is in the field of scrapers.

BACKGROUND

Many manual scrapers exist in the industry as this is the most common means to lock a blade in the extended position. This is achieved by including one or more locking features that hold the blade extended from the housing during use, and retracted safely into the housing for storage.

However, it is recognized that a scraper with auto-retract functionality would be beneficial as a safety improvement to allow the blade to be exposed and extended from the housing in use, then auto-retracted for storage between uses while in a hand, a pocket, pouch, or other storage means.

The problem with a typical auto-retract configuration is that when force is applied against the edge of the blade in the direction of the main longitudinal axis of the housing, the operational digit (for example, thumb or finger) applies a variable load or force against a slider in order to keep the blade extended from the housing. One skilled in the art of scraping, whether it be removing paint, labels, glues and adhesives, may understand that the force required to scrape effectively produces a non-constant, non-uniform force. Therefore, the combination of non-uniform/non-constant force, and the requirement to constantly apply force to the slider to keep it fully extended quickly produces fatigue to the finger or thumb of the user of this type of scraper.

SUMMARY

An auto-retract scraper is described herein. The auto-retract scrape comprises a housing, a slider, a blade, a rotating hard stop, and a torsion spring. The rotating hard stop is rotated clockwise forcing the blade forward and out of the housing when the slider is engaged.

BRIEF DESCRIPTION OF THE DRAWINGS

A set of hand drawings and photos of a mockup of the present invention are provided herewith for display purposes. One of ordinary skill in the art would appreciate that these are for illustrative purposes only and that there could be many variations and embodiments of the present invention, formed in a variety of shapes and sizes. These illustrations, along with the detailed description below, would enable one of ordinary skill in the art to understand and practice the invention.

DETAILED DESCRIPTION OF THE DRAWINGS

Figure 1:
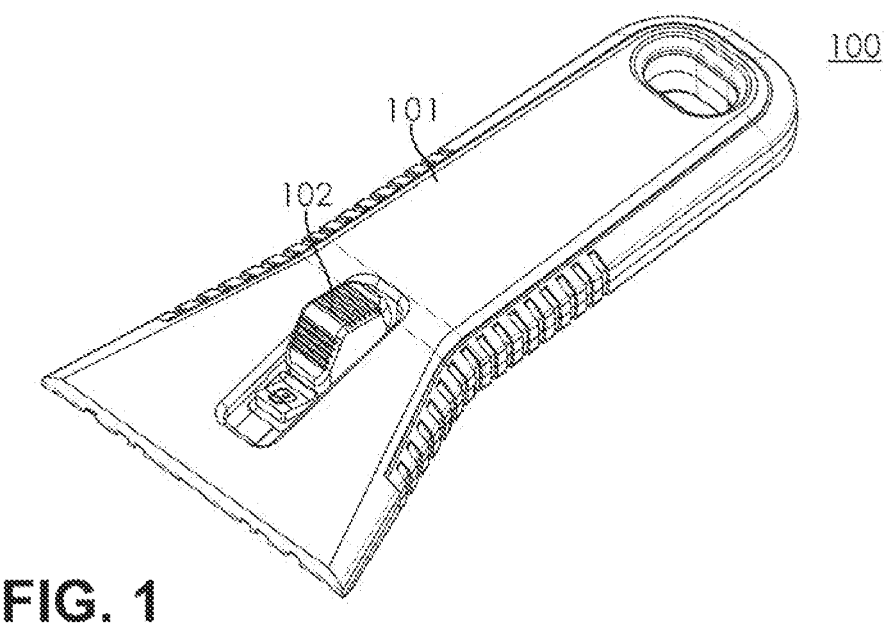
FIG. 1 is an example of a scraper.

This invention is described in the following description with reference to the Figures, in which like reference numbers represent the same or similar elements. While this invention is described in terms of modes for achieving this invention's objectives, it will be appreciated by those skilled in the art that variations may be accomplished in view of these teachings without deviating from the spirit or scope of the present invention. The embodiments and variations of the invention described herein, and/or shown in the drawings, are presented by way of example only and are not limiting as to the scope of the invention.

Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

The present invention generally relates to automatic scrapers. Specifically, embodiments of the present invention relate to a scraper with an auto-retractable blade. Embodiments of the scraper are further comprised of a blade slider button and an interlocking mechanism.

According to an embodiment of the present invention, the scraper described herein may be comprised of a body section, a slider button, a blade, and an interlocking mechanism. The body section may be comprised of a top piece and a bottom piece. The interlocking mechanism may be comprised of a rotating hard stop and a torsion spring.

According to an embodiment of the present invention, the scraper described herein may have a v-shaped head.

According to an embodiment of the present invention, the scraper described herein may have flexible tangs on either side of the blade on the carrier. The tangs may keep the blade from falling out of the housing when the blade is fully extended to change the blade.

According to an embodiment of the present invention, the scraper described herein may have a replaceable blade.

FIGS. 1-4 are an example of an auto-retract scraper from different perspectives. The scraper 100 may include a housing 101 and a slider 102. The housing 101 may include a top and bottom cover. The housing 101 may further include a rotating hard stop, a torsion spring, a slider return spring, and a blade. The blade may be ceramic. The slider button 102, when engaged, may force the blade to extend out from the housing 101 of the scraper.

Figure 2:
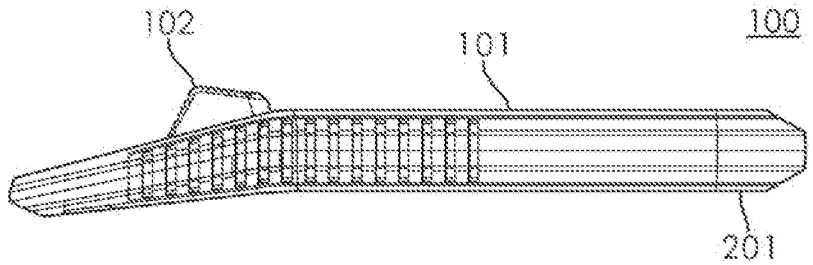
FIG. 2 is an example of a side view of the scraper.

FIG. 2 is an example of a side view of the scraper. The scraper 100 may include a housing 101 and a slider 102.

Figure 3:
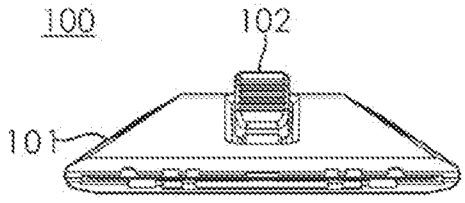
FIG. 3 is an example of a front view of the scraper.

FIG. 3 is an example of a front view of the scraper. The scraper 100 may include a housing 101 and a slider 102.

Figure 4:
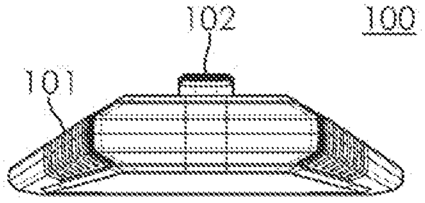
FIG. 4 is an example of a rear view of the scraper.

FIG. 4 is an example of a rear view of the scraper. The scraper 100 may include a housing 101 and a slider 102.

The scraper described herein may improve an interlocking aspect by using a rotating hard stop (or rotating blade stop) in combination with a torsion spring. An embodiment of the present invention does not depend on plastic materials for the rotational return spring function. The rotating hard stop and the metal torsion spring allows for a separation of the mechanical strength requirements of the rotating hard stop from the metal spring return requirements of the torsion spring.

A rotating hard stop or rotating blade stop in combination with the torsion spring are at least one aspect of the scraper that helps differentiate it from any prior art. This combination does not depend on plastic materials for the rotational return spring function. The rotating plastic hard stop and the metal torsion spring allow the embodiment to separate the mechanical strength requirements of the plastic hard stop from the metal spring return requirements of the torsion spring. This combination may improve both quality and repeatability of a mechanism that requires robust performance over a wide range of temperatures, and over a long life cycle with very high duty cycle requirements.

Figure 5A:
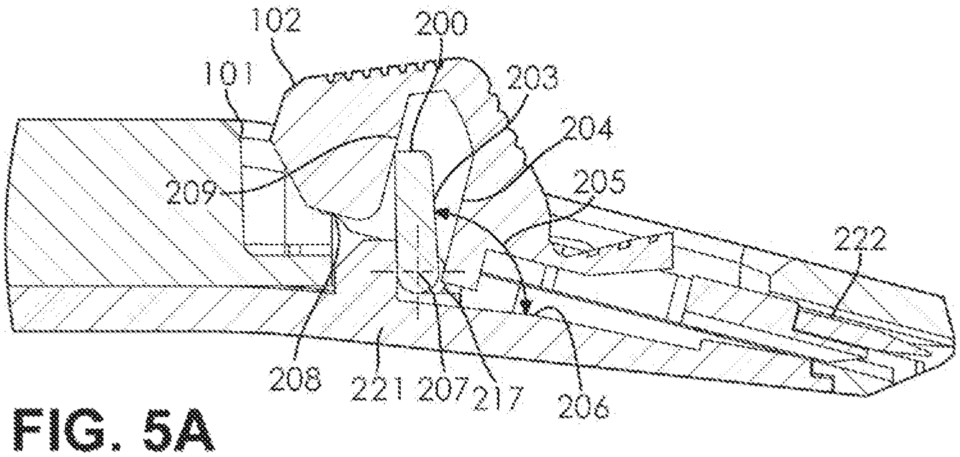
FIG. 5*a*-5*c* are an example of the rotating hard stop in a first position.
Figure 5B:
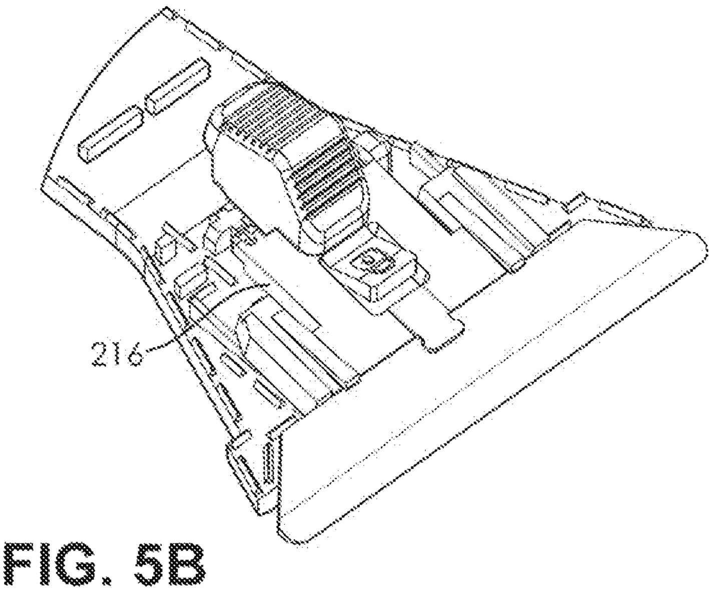
Figure 5C:
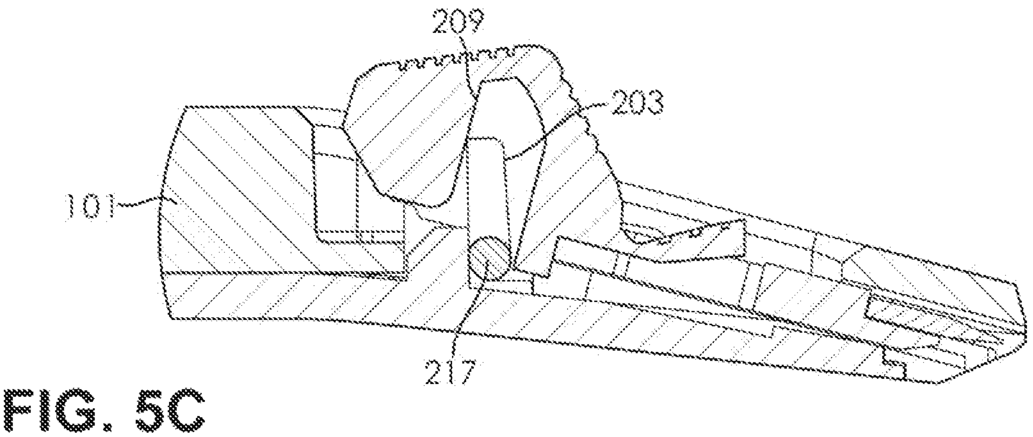
Figure 6:
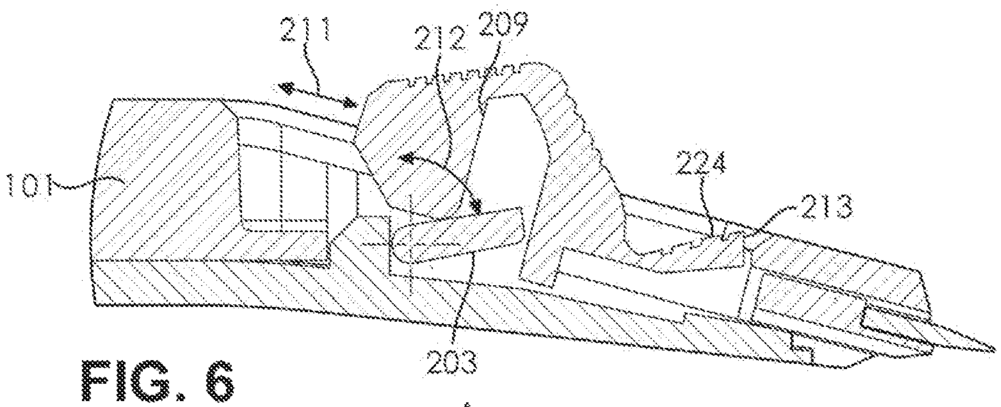
FIG. 6 is an example of the rotating hard stop in an intermediate position.
Figure 7:
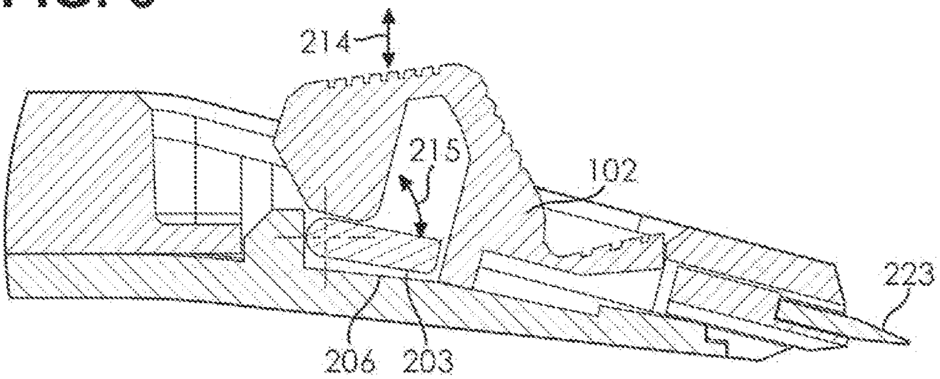
FIG. 7 is an example of the rotating hard stop in a the final locked position.

The preferred embodiment is illustrated in FIGS. 5-7.

FIGS. 5*a*-5*c* are an example of the rotating hard stop in a first position. FIG. 5 shows a housing 101 including a bottom cover 221, a slider (or blade carrier) 102, a rotating hard stop (or rotating blade stop) 203, a torsion spring 217, a slider return spring 216, and a blade (for example, a ceramic blade) 222. As illustrated in FIG. 5, the rotating hard stop 203 may be urged in a clockwise rotation about a centerline "Z" rotational axis 207 by the slider 102, as the slider 102 is pushed in a horizontal "X" axis direction engaging a pusher face 209 to bear force against the rotating hard stop 203. FIG. 5 further illustrates an opposing hard stop "X" 202, an opposing hard stop "Y" 208, an opposing hard stop "Z" 206, and a full range of rotation 205 for the rotating hard stop 203. Once the force is released against the slider 102 by removing the thumb or finger, the slider 102 may return to the retracted positon as shown in FIG. 5 by means of the slider return spring 216. At the same time, the rotating hard stop 203 may rotate back to a vertical "home" position by means of the torsion spring 217. When the slider 102 is forced in both the "X" axis and "Y" axis simultaneously, in combination with the locking geometry of the rotating hard stop 203 against the opposing hard stop face 204 and the hard stop "Y" axis 208, may allow the slider 102 with the blade 222 installed to resist the opposing "−X" directional force 223.

FIG. 6 is an example of the rotating hard stop in an intermediate position. The intermediate position may be described by a length of travel "X" axis 211. The pusher face 209 may urge the rotating hard stop 203 to an approximate 80 degrees "Z" axis rotation 212 position. At the same time a slider blade release hard stop 213 may be forced against an opening edge of the housing 101 at a hard stop "Y" direction 224.

FIG. 7 is an example of the rotating hard stop in a final locked position. The slider 102 may be urged in the "Y" axis 214 direction as limited by the opposing hard stop "Z" 206. This may further urge the rotating hard stop 203 to rotate into a secondary rotation lock position 215 to achieve a full range of rotation 205, approximately 100 degrees. When the slider 102 is forced in both the "X" axis and "Y" axis simultaneously, in combination with the locking geometry of the rotating hard stop 203 against the opposing hard stop face 204 and the hard stop "Y" axis 208, may allow the slider 102 with the blade 222 installed to resist the opposing "−X" directional force 223.

Figure 8:
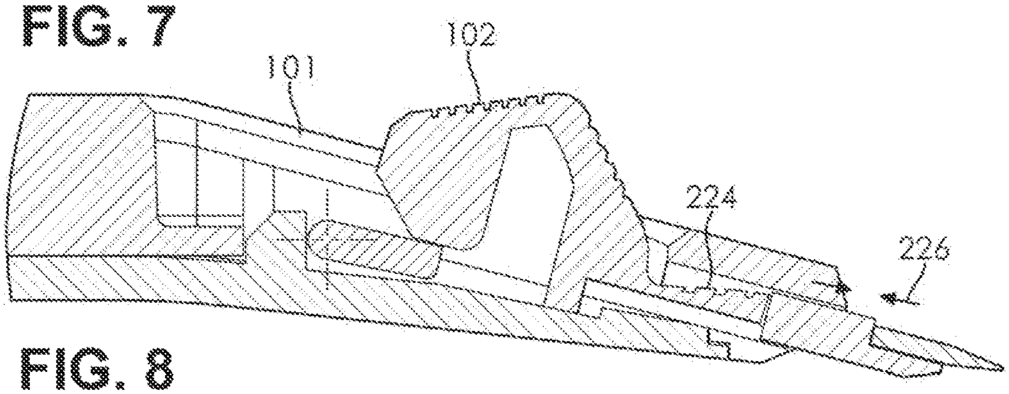
FIG. 8 is an example of a slider blade release.

FIG. 8 is an example of a slider blade release. A slide blade release hard stop 213 may function to not only limit the "X" axis travel, as described herein, but may also be pressed in the Hard Stop "−Y" direction 224 to release the slider 102, allowing the blade 222 to travel beyond an opening of the housing 101 for blade replacement clearance 226.

Figure 9:
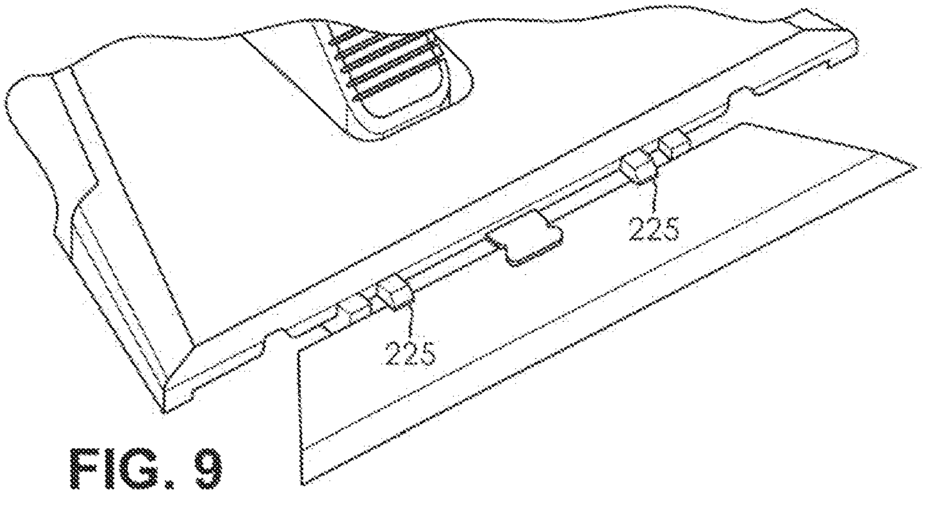
FIG. 9 is an example of the blade retention tabs.

FIG. 9 is an example of the blade retention tabs. Blade retention tabs 225 may be flexible beam members that provide force against the blade to prevent the blade 222 from inadvertently or accidentally falling out of the slide.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed:

1. A scraper actuation mechanism comprising:

a slider button, wherein the slider button is adapted to slide between a scraping position and a retracted position;

a rotating stop that pivots between a first position and a second position as the slider button moves between the scraping position and the retracted position, wherein the rotating stop is adapted to prevent the slider button from moving toward the retracted position when rotating stop is in the second position; and a stop cavity formed within the slider button, wherein the stop cavity accommodates the rotating stop when the rotating stop is in the first position.

2. The scraper actuation mechanism of claim 1, further comprising a stop flange extending from a front wall of the stop cavity at a bottom portion of the slider button, wherein the stop flange is adapted to abut with a top face of the rotating stop when the rotating stop is in the second position.

3. The scraper actuation mechanism of claim 1, further comprising a stop holder face formed on a rear bottom portion of the slider button, wherein the stop holder face is configured to hold the rotating stop in the second position when the slider button is in the scraping position.

4. The scraper actuation mechanism of claim 1, wherein the stop cavity has a first end defined by an opening that is open to a bottom side of the slider button and a second end opposite of the first end that is closed to provide a thumb or finger switch.

5. The scraper actuation mechanism of claim 1, further comprising a spring element connected to the rotating stop and adapted to rotationally bias the rotating stop to the first position.

6. The scraper actuation mechanism of claim 1, further comprising a blade release extending from a front base portion of the slider button.

7. A scraper actuation mechanism comprising:

a slider formed with a slider button at a first end of the slider, wherein the slider is adapted to slide between a scraping position and a retracted position;

a rotating stop that is adapted to rotate between a first position and a second position;

a stop cavity formed within the slider button, the stop cavity being adapted to accommodate the rotating stop when the rotating stop is in the first position, wherein the stop cavity has a first end defined by an opening that is open to a bottom side of the slider button and a second end opposite of the first end that is closed to provide a thumb or finger switch;

a pusher face forming a portion of a rear wall of the stop cavity, wherein the pusher face is adapted to push the rotating stop into the second position as the slider is moved to the scraping position;

a stop holder face formed on a rear bottom portion of the slider button, wherein the stop holder face is configured to hold the rotating stop in the second position when the slider is in the scraping position; and a blade release extending from a front base portion of the slider button.

8. The scraper actuation mechanism of claim 7, further comprising a stop flange extending from a bottom portion of the slider and formed continuously with a front wall portion of the stop cavity, wherein the stop flange is adapted to abut the rotating stop when rotating stop is in the second position in order to prevent the slider from moving toward the retracted position.

9. The scraper actuation mechanism of claim 7, wherein the rotating stop is adapted to prevent the slider from moving toward the retracted position when rotating stop is in the second position.

10. The scraper actuation mechanism of claim 7, further comprising a spring element connected to the rotating stop and adapted to rotationally bias the rotating stop to the first position.

11. The scraper actuation mechanism of claim 7, wherein the blade release button is configured to flex under a portion of a housing retaining the scraper actuation mechanism.

12. The scraper actuation mechanism of claim 7, further comprising a blade holder at a second end of the slider.

13. The scraper actuation mechanism of claim 12, further comprising one or more blade retention tabs formed along a front edge of the blade holder, wherein the blade retention tabs are adapted to hold a blade in place on the blade holder.

14. A scraper actuation mechanism comprising:

a slider button, wherein the slider button is adapted to slide between a scraping position and a retracted position;

a rotating stop rotatable between a first and second position, wherein the rotating stop has a first end that is attached to a pivot point and a second end that is opposite the first end;

a stop cavity formed within the slider button, wherein the stop cavity is adapted to accommodate the rotating stop when the rotating stop is in the first position; and a stop flange extending from a front wall of the stop cavity at a bottom portion of the slider button, wherein the stop flange is adapted to abut the second end of the rotating stop when the rotating stop is in the second position in order to prevent the slider button from moving toward the retracted position.

15. The scraper actuation mechanism of claim 14, further comprising a spring element connected to the rotating stop and adapted to rotationally bias the rotating stop to the first position.

16. The scraper actuation mechanism of claim 14, further comprising a blade holder attached to the slider button.

17. The scraper actuation mechanism of claim 16, further comprising a blade release extending from a front base portion of the slider button, wherein the blade release is configured to flex into a housing retaining the slider button.

18. The scraper actuation mechanism of claim 17, wherein the slider button is further adapted to slide between a scraping position and a blade change position that is in an opposite direction of the retracted position.

19. The scraper actuation mechanism of claim 18, wherein the blade holder extends outside of the housing when the slider button is in the blade change position.

* * * * *